United States Patent [19]

Hayasaka

[11] Patent Number: 5,050,912
[45] Date of Patent: Sep. 24, 1991

[54] REUSABLE VASE CONNECTION FOR A MARINE PROPULSION UNIT

[75] Inventor: Kenichi Hayasaka, Hamamatsu, Japan

[73] Assignee: Sanshin Kogyo Kabushiki Kaisha, Hamamatsu, Japan

[21] Appl. No.: 426,876

[22] Filed: Oct. 25, 1989

[30] Foreign Application Priority Data

Oct. 25, 1988 [JP] Japan ............................. 63-269238

[51] Int. Cl.⁵ .............................................. F16L 33/20
[52] U.S. Cl. ..................... 285/222; 285/214; 285/258
[58] Field of Search ............ 285/222, 214, 258, 382.4, 285/382.5, 253, 259

[56] References Cited

U.S. PATENT DOCUMENTS

| 633,037 | 9/1899 | Pfahler | 285/214 |
|---|---|---|---|
| 1,102,163 | 6/1914 | Opperud | 285/214 |
| 1,181,856 | 5/1916 | Downer | 285/214 |
| 1,613,523 | 1/1927 | Megathlin | 285/214 |
| 2,735,698 | 2/1956 | Brinen | 285/222 |
| 3,211,476 | 10/1965 | Wagner | 285/258 |
| 4,773,678 | 9/1988 | Canaud et al. | 285/258 |

FOREIGN PATENT DOCUMENTS

| 2814489 | 10/1979 | Fed. Rep. of Germany | 285/222 |
|---|---|---|---|
| 5702 | 6/1906 | France | 285/222 |
| 73238 | 12/1931 | Sweden | 285/214 |
| 450984 | 7/1936 | United Kingdom | 285/222 |
| 560571 | 4/1944 | United Kingdom | 285/222 |
| 661268 | 11/1951 | United Kingdom | 285/258 |

Primary Examiner—Eric K. Nicholson
Attorney, Agent, or Firm—Ernest A. Beutler

[57] ABSTRACT

A number of embodiments of sea water hose fixing devices for fixing a conduit within an opening of a marine outboard drive without damaging the hose so as to permit reuse of the hose upon disassembly. The conduit is maintained within the opening by means of a pair of interengaging inner members that interlock with the conduit and interlock the conduit with that member in which it is received without causing damage of the conduit so as to facilitate reuse.

8 Claims, 3 Drawing Sheets

REUSABLE VASE CONNECTION FOR A MARINE PROPULSION UNIT

BACKGROUND OF THE INVENTION

This invention relates to a sea water hose fixing device and more particularly to an arrangement for affixing a flexible conduit or hose within an opening in a member for accommodating water flow.

In many applications, a flexible conduit or hose is used for conveying water between a pair of locations. For example, it is a common practice to use a flexible hose that is affixed to the outboard drive unit of an inboard/outboard drive for conveying water from the body of water in which a watercraft is operating to the inboard mounted engine for its cooling. In order to provide a neat, compact and trouble free fitting it has been the practice to form an opening in the outboard drive unit and to insert the hose into this opening and then expand the hose into tight gripping relationship with the member that defines the opening for providing the connection. This is frequently done through the use of an externally threaded hollow member that is screwed into the hose end and which expands it into a compression fitting with the member in which the opening is formed. Although this type of device has certain advantages, the use of the threaded insert damages the inner wall of the hose and when it is necessary for disassembly, the hose must be replaced. This is obviously a problem.

It is, therefore, a principle object of this invention to provide an improved hose fixing device wherein a hose or flexible conduit can be secured within an opening formed in a member without damaging the hose.

It is a further object of this invention to provide a removable hose fixing connection wherein the hose may be disconnected and reconnected without the necessity of replacing the hose.

SUMMARY OF THE INVENTION

This invention is adapted to be embodied in a construction for attaching a flexible conduit within an opening of a member. The construction comprises a first inner member that is formed as a resilient sleeve and which is sized to be inserted within one end of the conduit when the conduit is received within the member opening. The outer surface of the first inner member has gripping means that are adapted to yieldably engage the inner surface of the hose for interlocking therewith upon expansion of the first inner member. A second inner member is provided for insertion into the first inner member when the first inner member is received in the conduit. Wedging means are formed between the first and second inner members for expansion of the first inner member gripping means into interlocking relationship with the conduit and for expanding the conduit into interlocking relationship with the member opening upon axial insertion of the second inner member into the first inner member.

DETAILED DESCRIPTION OF THE PREFERRED EMBODIMENTS OF THE INVENTION

Figure 1:
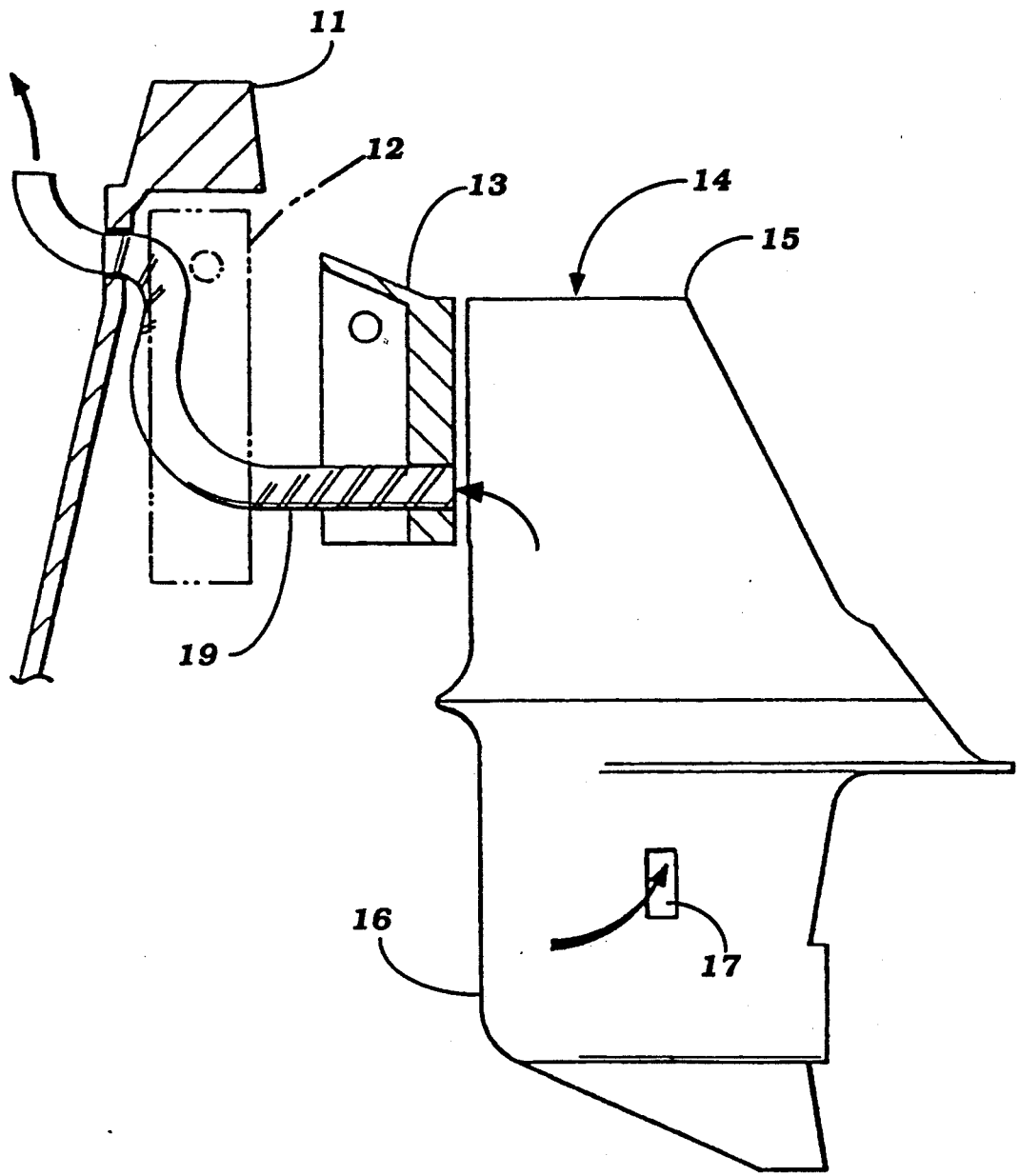
FIG. 1 is a partial side elevational view of an inboard/outboard drive mechanism incorporating a sea water hose fixing device constructed in accordance with an embodiment of the invention, with portions broken away.

Referring first to FIG. 1, a typical environment in which the invention can be utilized is illustrated. This is in the provision of a hose connection for an inboard/outboard drive that is shown partially and attached to a transom 11 of a watercraft. The inboard/outboard drive unit includes an internal combustion engine (not shown) that is mounted forwardly of the transom 11 and which drives a shaft that extends through the transom 11. Affixed to the rear side of the transom 11 is a gimbal ring, shown in phantom and identified by the reference numeral 12. The gimbal ring 12 interconnects the transom plate 12 with a swivel housing 13 which forms a portion of an outboard drive unit, indicated generally by the reference numeral 14. The outboard drive unit 14 is supported for steering and tilt and trim movement relative to the transom 11 in a known manner. The outboard drive unit 14 further includes a housing 15 within which a transmission (not shown) is positioned for driving a propulsion unit such as a propeller mounted on a lower unit 16 of the outboard drive 14. Contained within the housing 15 is also a water pump assembly that draws water through an inlet opening 17 formed in the lower unit 16 and which delivers it to a flexible conduit or hose 19 that is affixed in a manner to be described to the swivel bracket 13. The conduit 19 delivers cooling water to the inboard mounted engine in a known manner.

Figure 2:
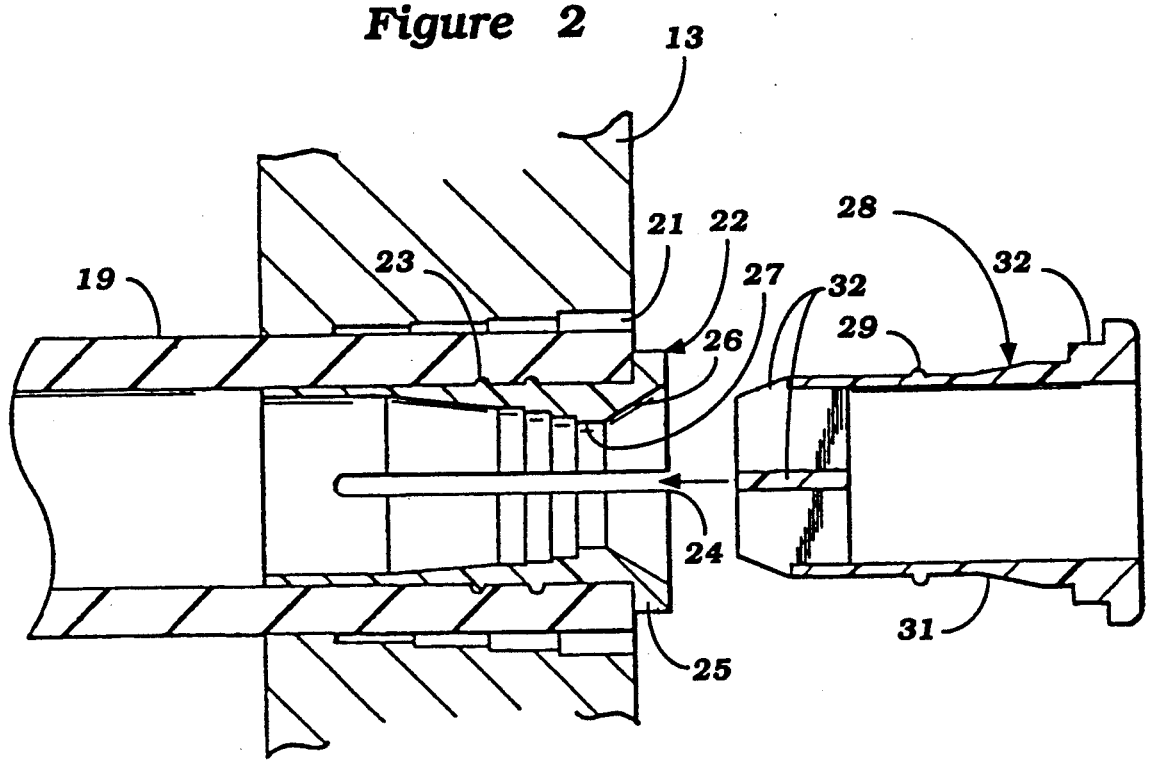
FIG. 2 is an enlarged cross sectional view showing the construction prior to insertion of the second inner member.
Figure 3:
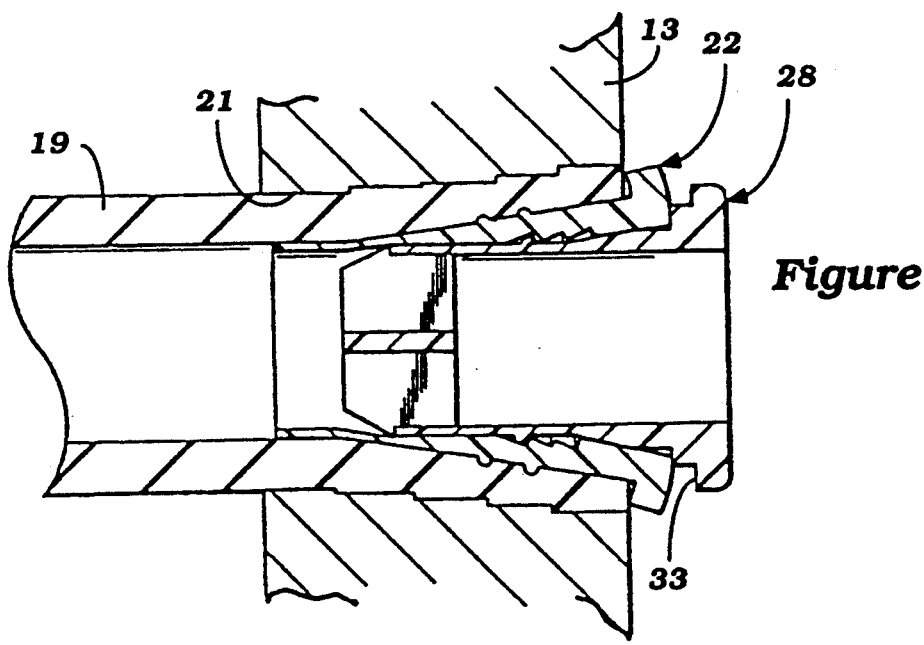
FIG. 3 is an enlarged cross sectional view in part similar to FIG. 2, and shows the completion of the connection.

Referring now in detail to FIGS. 2 and 3, an embodiment of construction for maintaining the conduit 19 in the swivel bracket 13 will be described. It will be seen in bracket 13 is formed with a stepped opening 21 which on the forward or transom side has an internal diameter that is substantially the same as the external diameter of the conduit 19. Successively increasing diameter bores or counterbores extend toward the rear face of the swivel bracket 13 so as to provide a clearance as shown in FIG. 2 with the outer surface of the conduit 19 when the conduit 19 is inserted therein and before the connection is completed.

A first inner member indicated generally by the reference numeral 22 and having a generally sleeve shape is adapted to be inserted into the open end of the conduit 19 either after the conduit 19 is received in the opening 21 of the swivel bracket 13 or before. It will be seen that the first inner member 22 has a generally cylindrical outer surface on which a pair of circumferentially extending spaced ribs 23 are formed. In addition, the first inner member 22 is made resilient by means of a pair of slits 24 that extend from a flange 25 formed at the rear or outer face thereof along a substantial portion of the length of the first inner member 22. The inner member 22 may be formed from any suitable resilient material including plastics.

The first inner member 22 is also provided with a pair of oppositely tapered surfaces 26 and 27. The tapered surface 26 tapers inwardly from the rear face of the flange 25 and is in a conical shape. The tapered surface 27 is, in the illustrated embodiment, formed by a series of stepped bores that increase in diameter from the throat of the tapered surface 26 in a forward direction.

A second inner member, indicated generally by the reference numeral 28, is adapted to be inserted into the first inner member 22 for expanding it into locking engagement with the conduit 19 and for expanding the conduit 19 into interlocking relationship with the step portion of the opening 21 as shown in FIG. 3. The second inner member 28 has a generally cylindrical surface that is formed with one or more circumferentially extending locking rib 29 and a tapered wedging portion 31. The wedging portion 31 cooperates with the first inner member wedging surface 26 so as to urge it outwardly upon insertion in an axial direction. It should be noted that the leading end of the second inner member 28 is formed with a pair of cross ribs 32 for reinforcing. The second inner member 28 is inserted until a flange 32 of the second inner member 28 engages the flange 25 of the first inner member 22 will stop additional movement. It will be seen that the first inner member 22 is cammed outwardly so that its locking projections 23 interlock with the inner surface conduit 19 so as to resist disassembly. In addition, the conduit 19 is deflected outwardly into interlocking relationship with the opening 21.

The locking projection 29 of the second inner member will engage one of the steps of the first inner member wedging surfaces 27 so as to provide a releasable lock. In order to release the connection, a flat bladed tool such as a screwdriver is inserted into a circumferential groove 33 formed upon installation (FIG. 3) so as to deflect the first inner member 22 outwardly sufficient to clear its interlocking relationship with the projection 29 and to permit the second inner member 28 to be removed. This can be done without any damage to the hose 19 so the hose can be utilized again.

Figure 4:
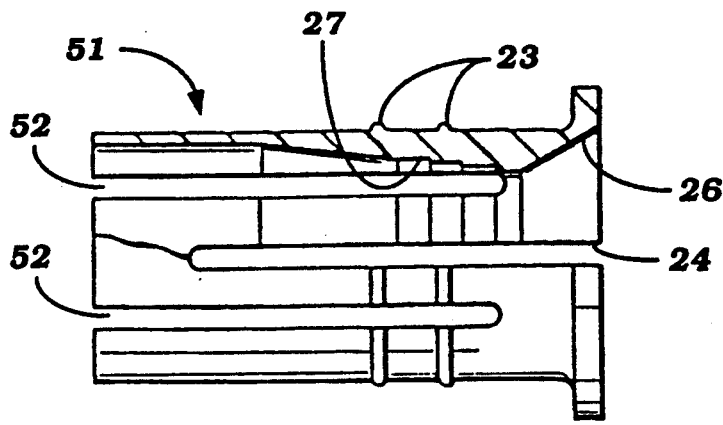
FIG. 4 is an enlarged side elevational view with a portion broken away, of a first inner member constructed in accordance with a second embodiment of the invention.

A first inner member having a slightly modified construction is identified by the reference numeral 51 in FIG. 4. This member 51 has generally the same configuration as the previously described embodiment and those portions of the construction which are the same have been identified by the same reference numerals. It should be noted that in this member 51 in addition to the slots 24 there are provided a series of slots 52 that extend from the opposite end of the first inner member 51 so as to increase the resilience thereof. The construction and operation of this embodiment is believed to be obvious and further description is, therefore, believed to be unnecessary.

Figure 5:
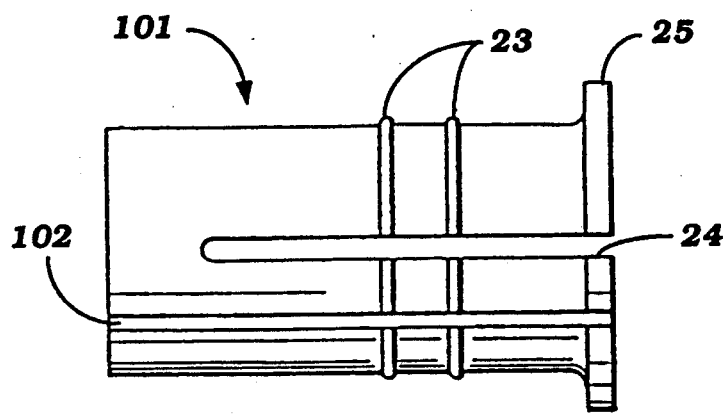
FIG. 5 is a side elevational view of a first inner member constructed in accordance with another embodiment of the invention.

A still further embodiment of first inner member is identified by the reference numeral 101 in FIG. 5. In this embodiment, there are provided one or more slots 102 that extend the full length of the first inner member 101 so as to further increase its resilience. In all other regards this embodiment is the same as those previously described.

Figure 6:
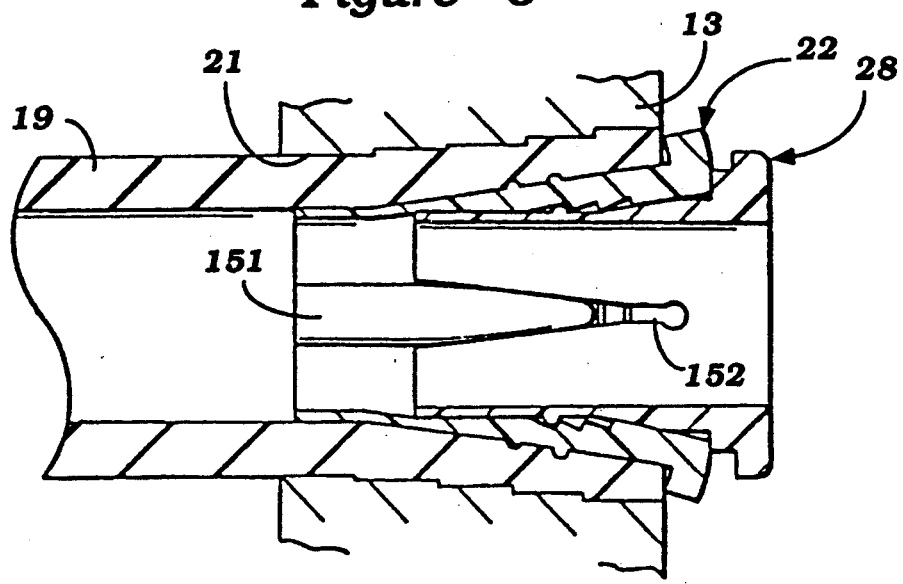
FIG. 6 is a cross sectional view in part similar to FIG. 3, and shows yet another embodiment of the invention.

FIG. 6 shows yet another embodiment of the invention. In this embodiment, the first inner member 22 is formed with a wedging projection 151 that is adapted to be received in a corresponding shaped slot 152 formed in the second inner member 28. As a result, when the second inner member 28 is inserted within the first inner member 22, the forward end of the second member 28 will be cammed outwardly so as to further assist in the deflection of the first inner member 22 and the conduit 19 so as to improve the interlocking relationship.

It should be readily apparent from the foregoing description that a number of embodiments of hose fixing devices have been illustrated and described each of which provides a very good connection between the components without damaging the hose or conduit so that it can be reused upon disassembly. Although a number of embodiments have been illustrated and described, various changes and modifications may be made without departing from the spirit and scope of the invention, as defined by the appended claims.

I claim:

1. A construction for attaching an open end of an elastic hose within an opening extending through a member comprising a first inner member formed as a resilient sleeve and sized to be inserted into the open end the open end of the hose when said hose is received within said member opening, the outer surface of said first inner member having gripping means and being expandable for yieldably engaging the inner surface of said hose for interlocking therewith upon expansion of said first inner member without damaging said hose in a manner to prevent its reuse, a second member inserted into said first inner member from said open end of said hose when said inner member is received in said hose and said hose is received in said opening, and wedging means on said first and said second inner members for expanding said first inner member gripping means into interlocking relationship with said hose and expanding said hose into interlocking relationship with said opening upon axial insertion of said second inner member into said first inner member from said open end without damaging said hose, said hose and said first and said second inner members forming a flow passage when assembled together.

2. A construction for attaching an elastic hose as set forth in claim 1 wherein the opening in the member is formed with means for resiliently interlocking with the outer surface of the hose when the hose is deformed.

3. A construction for attaching an elastic hose as set forth in claim 2 wherein the interlocking means in the opening comprises a plurality of stepped openings.

4. A construction for attaching a flexible hose as set forth in claim 1 wherein the first inner member comprises a split sleeve for increasing its resilience.

5. A construction for attaching a flexible hose as set forth in claim 4 wherein the first inner member has at least one slot extending through its full length.

6. A construction for attaching a flexible hose as set forth in claim 4 wherein the first inner member has at least one slot extending from one end thereof toward the other end thereof.

7. A construction for attaching a flexible hose as set forth in claim 6 wherein the slot extends from the end which is adapted to receive the second inner member.

8. A construction for attaching a flexible hose as set forth in claim 6 wherein the slot of the first inner member extends from the end opposite to that in which the second inner member is received.

* * * * *

UNITED STATES PATENT AND TRADEMARK OFFICE
CERTIFICATE OF CORRECTION

PATENT NO. : 5,050,912

DATED : September 24, 1991

INVENTOR(S) : Kenichi Hayasaka

It is certified that error appears in the above-identified patent and that said Letters Patent is hereby corrected as shown below:

On the Title Page in the Title, "VASE" should be --HOSE--.

Abstract line 7, "that" should be --the-.

Column 4, line 24, Claim 1, after "end" (first occurrence) insert --from--.

Column 4, line 50, Claim 4, "a flexible" should be --an elastic--.

Column 4, line 53, Claim 5, "a flexible" should be --an elastic--.

Column 4, line 56, Claim 6, "a flexible" should be --an elastic--.

Column 4, line 60, Claim 7, "a flexible" should be --an elastic--.

Column 4, line 63, Claim 8, "a flexible" should be --an elastic--.

Signed and Sealed this

Twentieth Day of July, 1993

Attest:

MICHAEL K. KIRK

*Attesting Officer*  *Acting Commissioner of Patents and Trademarks*